United States Patent [19]

Schwarz et al.

[11] Patent Number: 5,114,902

[45] Date of Patent: May 19, 1992

[54] PROCESS OF MAKING SUPPORTED CATALYST

[75] Inventors: James A. Schwarz, Fayetteville, N.Y.; Somasundaram Subramanian, Melvindale, Mich.

[73] Assignee: Syracuse University, Syracuse, N.Y.

[21] Appl. No.: 471,413

[22] Filed: Jan. 29, 1990

[51] Int. Cl.⁵ .................. B01J 21/04; B01J 21/06; B01J 23/42; B01J 23/46

[52] U.S. Cl. .................. 502/334; 502/332; 502/242; 502/262; 502/313; 502/308; 502/254; 502/336; 502/335

[58] Field of Search .............. 502/332, 333, 334, 335, 502/305, 243, 261, 230, 262, 325, 242, 313, 308, 254, 336, 339

[56] References Cited

U.S. PATENT DOCUMENTS

| | | | |
|---|---|---|---|
| 2,481,238 | 9/1949 | Pierce et al. | 502/336 |
| 2,708,187 | 5/1955 | Kearby | 502/334 |
| 2,840,514 | 8/1954 | Brennan et al. | 502/230 X |
| 3,418,258 | 12/1968 | Ackermann et al. | 502/332 X |
| 3,523,966 | 8/1970 | Ottman et al. | 502/261 X |
| 3,691,064 | 9/1972 | Hayes et al. | 502/230 X |
| 3,779,947 | 12/1973 | Mitsche et al. | 502/332 X |
| 3,784,484 | 1/1974 | Innes et al. | 502/230 |
| 3,789,020 | 1/1974 | Carter et al. | 502/230 |
| 3,853,790 | 12/1974 | Vosolsobe et al. | 502/332 X |
| 3,867,314 | 2/1975 | Erickson | 502/334 |
| 3,912,661 | 10/1975 | Numagami et al. | 502/333 |
| 3,933,685 | 1/1976 | Madderra et al. | 502/332 |
| 3,940,190 | 2/1976 | Hayes | 208/137 |
| 3,953,368 | 4/1976 | Sinfelt | 502/230 X |
| 3,969,221 | 7/1976 | Mitchell et al. | 208/139 |
| 3,988,263 | 10/1976 | Hansford | 502/332 X |
| 4,097,412 | 6/1978 | Muller | 502/332 X |
| 4,169,785 | 10/1979 | Eberly, Jr. | 502/230 X |
| 4,189,405 | 2/1980 | Knapton et al. | 502/332 X |
| 4,233,139 | 11/1980 | Murrell et al. | 502/305 X |
| 4,264,475 | 4/1981 | Schoennagel | 502/230 |
| 4,305,811 | 12/1981 | Johnson | 502/230 X |
| 4,341,662 | 7/1982 | Pfefferle | 502/261 X |
| 4,477,590 | 10/1984 | Kresge et al. | 502/334 |
| 4,490,477 | 12/1984 | Hobbs | 502/243 |
| 4,511,673 | 4/1985 | Eto | 502/334 |
| 4,522,939 | 6/1985 | Minderhand et al. | 502/332 X |
| 4,719,196 | 1/1988 | Vogt et al. | 502/304 |
| 4,777,303 | 10/1988 | Kitson et al. | 502/313 X |
| 4,837,193 | 6/1989 | Akizuki et al. | 502/332 X |
| 4,849,399 | 7/1989 | Joy, III et al. | 502/332 X |

OTHER PUBLICATIONS

Kirk-Othmer, *Encyclopedia of Chemical Technology,* 3rd ed. (1979), vol. 3, pp. 19 and 20.

Mieth et al., Experimental Procedures to evaluate Alumina Dissolution, Metal Ion Buffering, and Catalytic Precursor Speciation during Catalyst Preparation, Journal of Colloid and Interface Science, vol. 123, No. 2, Jun. 1988 pp. 366-379.

*Primary Examiner*—W. J. Shine
*Assistant Examiner*—Douglas J. McGinty
*Attorney, Agent, or Firm*—Wall and Roehrig

[57] ABSTRACT

Oxide supported metal catalysts have an additional metal present in intimate association with the metal catalyst to enhance catalytic activity. In a preferred mode, iridium or another Group VIII metal catalyst is supported on a titania, alumina, tungsten oxide, silica, or composite oxide support. Aluminum ions are readsorbed onto the support and catalyst, and reduced during calcination. The aluminum can be added as aluminum nitrate to the iridium impregnate solution, e.g. chloroiridic acid.

8 Claims, 1 Drawing Sheet

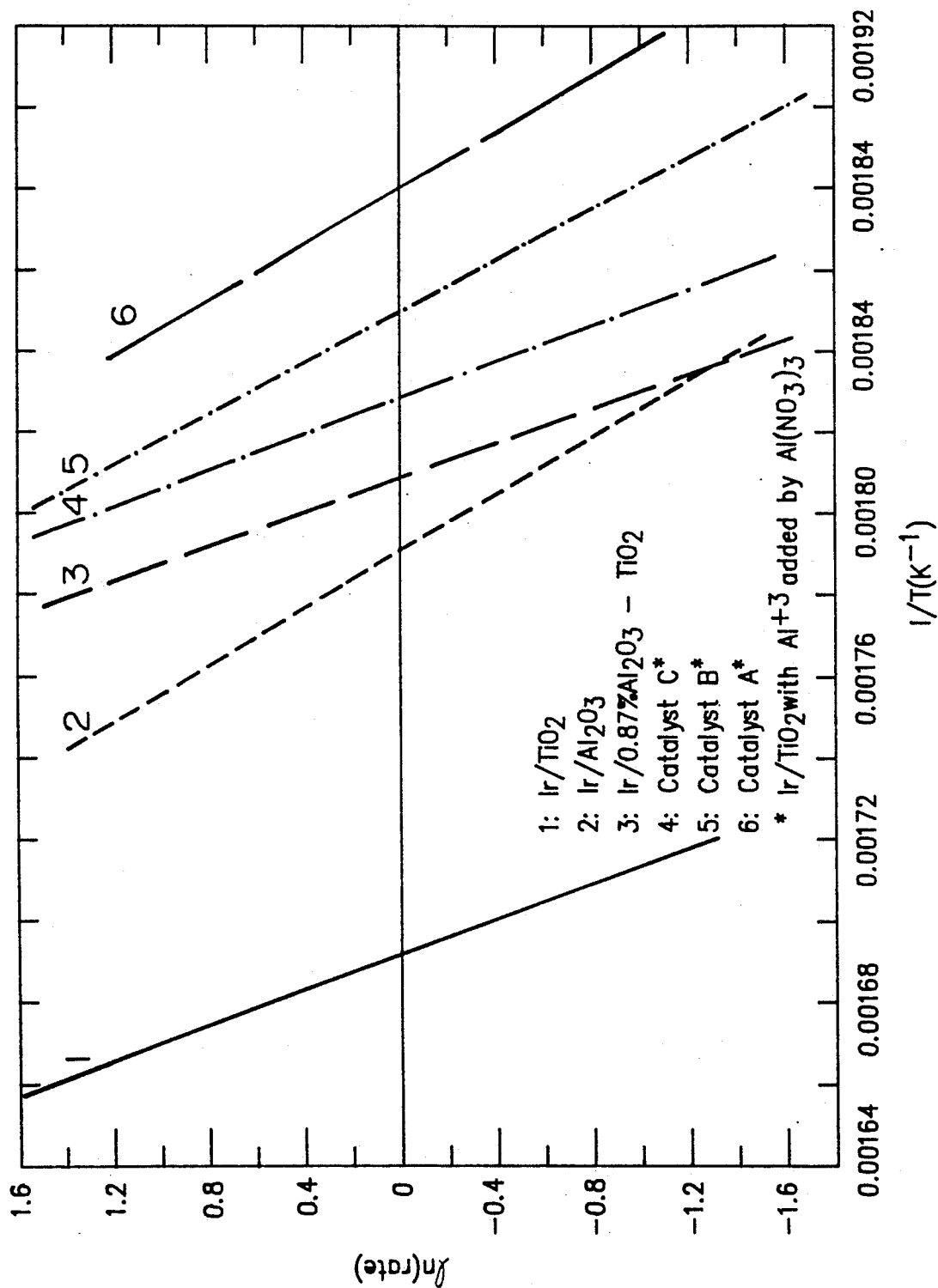

PROCESS OF MAKING SUPPORTED CATALYST

BACKGROUND OF THE INVENTION

This invention relates to improved supported metal catalysts, and to a method of making same. The invention is more particularly directed to a supported metal catalyst in which another metal is alloyed with the metal catalyst so that the catalyst has a higher activity at a given temperature then has been possible previously.

Typically, a supported catalyst involves a transition metal supported on an oxide support. The catalyst is frequently a noble metal such as platinum, palladium, or iridium, and the support can be, e.g. alumina ($Al_2O_3$), titania ($TiO_2$) a composite support ($Al_2O_3$-$TiO_2$) or another oxide such as silica or tungsten oxide. Composite binary oxides are often employed as supports because they can dispense an intrinsically low surface area carrier on a high surface area support in which the number, strength, and acidity of active sites can be controlled. These binary oxides also strongly influence the catalytic properties of the supported metals.

OBJECTS AND SUMMARY OF THE INVENTION

It is an object of this invention to provide a supported metal catalyst which has enhanced activity at a given temperature.

It is another object of this invention to provide a process for producing an improved supported metal catalyst.

It is a more specific object to alter the activity of a catalyst by the addition of metal ions during the preparation of the catalyst, the ions being derived from the support itself or externally added.

In the case of a catalyst with a composite oxide support, the impregnant solution that contains the catalyst precursor can dissolve ions from the metal oxide support. These ions serve as dopants that readsorb into the substrate or support along with the catalyst metal. In other cases, such as where the support is insoluble in the catalyst precursor impregnant solution, a metal salt containing the desired ions can be added to the electrolyte used to prepare the catalyst.

According to one aspect of the invention, a supported catalyst can be prepared of iridium on an alumina-titania or titania-alumina support. The iridium impregnant can be, for example, chloroiridic acid, which is a rather strong acid. This will dissolve $Al^{+++}$ ions from the support, and these ions are readsorbed by the support together with the iridium precursor. The catalyst is then calcined at an elevated temperature.

The amount of increased activity appears to increase with the amount of aluminum ion present in the impregnant solution.

Where the $Al^{+++}$ ion is introduced in the form of aluminum nitrate, the concentration of aluminum in the impregnant solution can be closely controlled.

Arrhenius plots for catalysts having various amounts of additional metal (e.g. Al) present indicate that the activity of the supported metal catalyst increases with higher concentration of the additional metal precursor in the impregnant solution.

In the broadest terms, any supported metal catalyst of the type in which one or more Group VIII transition metals are supported on an oxide substrate can be enhanced by the addition of a dopant into the impregnant solution, e.g., by means of a salt. The dopant can include aluminum or other metal, silicon, zirconium, or other elements outside Group VIII that will alloy with the metal catalyst.

The above and other objects, features, and advantages of this invention will be better understood from the ensuing description of a preferred embodiment of the catalyst of this invention and of methods of preparing same, with reference to the accompanying Drawing.

BRIEF DESCRIPTION OF THE DRAWING

The sole Drawing FIGURE is a chart showing Arrhenius graphs of catalytic activity with inverse temperature for a number of supported metal catalysts, including catalysts that embody the principles of the present invention.

DETAILED DESCRIPTION OF THE PREFERRED EMBODIMENT

A number of catalysts were prepared using alumina (BET i.e., Brunauerbment area 195 $M^2$/g, pore volume 0.5 cc/g), titania (BET area 50 $M^2$/g, nonporous), and 0.87% $Al_2\phi_3$-$TiO_2$ as supports. Thermal treatment and particle size of all the oxide supports were maintained uniform, with calcination at the same temperature and a uniform particle size of 40–80 mesh (0.225 mm).

Chloroplatinic acid and chloroiridic acid were employed as reagents. Required amounts of these reagents, as solids, were dissolved in air-saturated double distilled water having a pH of 5.6. One gram of oxide was contacted with 0.5 cc of these impregnation solutions for a 3% metal weight loading. The precursors were dried overnight at room temperature under darkness. The precursors were further dried in air at 423K for a period of one hour. A Thermolyne Furnace (Model 1300) was used for this purpose. The precursors were calcined in air at 673K for four hours. These constitute "Set I" precursors.

Another class of Ir/$TiO_2$ precursors was prepared in which $Al^{+++}$ ions were introduced into the metal system in the form of aluminum nitrate, $Al(N\phi_3)_3$ $9H_2O$. Here, the desired quantity of aluminum nitrate was dissolved into the Ir impregnation solution, i.e., aqueous chloroiridic acid solution, and the resulting solution was used to impregnate $TiO_2$. The resulting entities were dried and calcined. These constitute "Set II" precursors.

Ethane hydrogenolysis, i.e., conversion of $C_2H_6$ to $CH_4$, was employed to gauge the activity of the various catalysts prepared as above. For this purpose a reaction unit was set up to consist of three sections, to wit, a gas delivery system with facilities for mixing gases, a reactor assembly, and a gas chromatograph to assess the concentration of reactants and products.

The gas delivery system had capability of delivering ultra high purity argon, helium and 8.5% $H_2$/Ar, CP-grade $C_2H_6$, and research-grade $CH_4$. The gases were passed through Drierite to remove any traces of water vapor. The $H_2$/Ar mixture was further purified by passing it through an Oxy-Sorb deoxidizer. The gases were mixed by passing them through cylindrical vessels. These vessels were provided with three perforated plates in order to generate turbulence. Their inlet nozzles were also designed to provide a swirling motion. The gas flow rates were controlled with a Tylan Controller (Model FC-260), to control the partial pressure of the reactants at desired levels.

The reactor assembly and heating arrangements for the reaction unit were conventional.

An Antek 3000 Gas Chromatograph was used in conjunction with a Carbosieve II (Supelco Inc.) packed column to determine the concentrations of the products and reactants. The temperature of the column and detector filaments were controlled at 488K and 323K, respectively. A 200 mA bridge current was used. The products and reactants were periodically sampled using an on-line sampling loop in conjunction with a 6-way valve. The voltage signal from the gas chromatograph was monitored on an Esterline Angus (Model SS-260F) chart recorder.

The reaction conditions and procedures used are outlined below:

(1) Dehydration 100 mg of sample was flushed with Ar at a flow rate of 100 cc/min. The temperature of the sample was raised to 773K at 5K/min. The sample was held at 773K for a period of 1 h and then cooled to room temperature in flowing Ar.

(2) Reduction

The Ar flow was cut off and He was allowed to flow at 300 cc/min. The hydrogen flow rate was adjusted to 80 cc/min. Since the thermal conductivity of Ar is similar to that of ethane and methane, Ar cannot be used as a carrier gas. The flow rates used during reduction were similar to those used while conducting the reaction. The temperature of the reactor was raised to 773K at a heating rate of 20K/min. At the end of the reduction process, hydrogen was cut off and the sample was cooled in He to 523K.

(3) Reaction Conditions

The following gas flow rates were used to conduct the reaction: 300 cc/min of He, 80 cc/min of $H_2$ and 20 cc/min of $C_2H_6$. The total flow rate was maintained constant at 400 cc/min throughout the study. Thus, the partial pressures of the reactants were kept constant. The observed reaction rates could be distorted because of carbon deposition; it is desirable to use as high a ratio as possible of hydrogen partial pressure to ethane partial pressure. Since the activity of each of the catalysts studied was vastly different, the reaction temperature required to maintain differential conditions was found by trial and error. This was achieved by systematically raising the temperature of the reactor from 523K in steps of 10K; the reaction was carried out at conversion levels less than 5%.

(4) Sampling

In a typical experiment, the reactant gases were passed over the catalyst for three minutes prior to sampling. The ethane flow was then cut out and hydrogen and helium flow continued for fifteen minutes prior to any subsequent reaction This procedure was used to avoid complications due to changing catalyst activity, and it was repeated at each temperature until steady-state was achieved. The temperature was varied in a cyclical manner to test for hysteresis effects. Finally, the gas mixture containing ethane, hydrogen, and helium was diverted to by-pass the reactor to determine the composition of the feed mixture.

(5) Calibration

The only product obtained in this test reaction is methane. Known amounts of methane and ethane were injected with a gas tight syringe. A linear relationship was observed at low concentration levels. Calibration was periodically verified and was found to be reproducible within ±3.5%. Since the thermal conductivity of He and $H_2$ are similar, the sensitivity of the detector towards $H_2$ is low. Hence, the gas chromatograph was not calibrated with respect to hydrogen. The mass balance closure was verified by monitoring the ethane and methane concentrations. A carbonaceous residue may be present on single crystal Ir surfaces after ethane hydrogenolysis. In order to test for this possibility a catalyst sample that had been subjected to the test reaction was slowly heated (at 3K/min) in a mixture of helium and hydrogen. The discharge gas was periodically sampled and analyzed for methane. No methane was detected. These results suggest that if any carbonaceous residue exists it cannot be removed by heating the used catalyst in hydrogen. Thus, any adsorbed carbon would not likely affect the test in any significant way. Adsorbed carbon, however, may be removed if desired by treating the catalyst in oxygen.

Results

Hydrogen consumption observed for the $Al_2\phi_3$ supported catalysts was consistently higher than that observed for the $TiO_2$ supported precursors. Auxiliary X-ray fluorescence experiments showed that the amount of chloride retained by $TiO_2$ supported precursors after calcination was lower than that retained by $Al_2\phi_3$-supported precursors. However the hydrogen consumption observed for the composite-oxide supported precursors was similar to that observed for the $Al_2\phi_3$ supported precursors. This observation suggests that dissolution and readsorption of $Al^{+++}$ ions, originating from the $Al_2\phi_3$ present in the composite oxide, play a role in altering the precursors.

Also, the ethane hydrogenolysis results indicate that dissolved and readsorbed aluminum ion species alter the structure and performance of the composite oxide supported catalyst. In order to investigate the effect of $Al^{+++}$, a series of titania-supported iridium precursors and catalysts were prepared in which $Al^{+++}$ in the form of aluminum nitrate was introduced into the chloroiridic acid impregnation solution for Set II precursors. Aluminum nitrate at the concentration levels employed was completely soluble in the impregnation solutions, where it dissociated into $Al^{+++}$ and $NO_3$. Because a dry impregnation was employed, all of the added $Al^{+++}$ remained in the precursor. In the case of 0.87% $Al_2\phi_3$-$TiO_2$ supported Ir precursor, only a fraction of the $Al^{+++}$ that is released into solution from the $Al_2\phi_3$ is readsorbed. In this case the aluminum metal becomes incorporated into the Group VIII metal matrix and alters the catalytic activity.

The Al weight loading in the 0.87% $Al_2\phi_3$-$TiO_2$ supported Ir precursor is 0.46%. This corresponds to the maximum amount of aluminum that can be dissolved in the composite oxide system. In reality, the amount of readsorbed aluminum will be less than the total amount of aluminum present as $Al_2\phi_3$ in the composite oxide. The amount of $Al^{+++}$ readsorbed is not known precisely.

Three Set II precursors were prepared. The amount of aluminum nitrate added to the impregnating solution was varied to achieve Al loadings of 0.46%, 0.23%, and 0.11%. The precursors were calcined according to the standard procedure. These are referred to as Precursors A, B, and C, respectively. Precursor A represents the limiting case corresponding to total dissolution of available Al in the composite oxide (0.87% $Al_2O_3$-$TiO_2$) system. These were calcined as described previously to form catalysts A, B, and C, respectively.

Ethane hydrogenolysis activity of catalysts A, B, and C was measured. The Arrhenius plots for these data sets, as well as for Ir supported on $Al_2O_3$, $TiO_2$, and 0.87% $Al_2O_3$-$TiO_2$, are shown in the Drawing FIGURE. The activity of catalysts A, B, and C is higher than the activity of the Ir/$TiO_2$ catalyst. The readsorbed $Al^{+++}$ acts like a promoter, and increases the activity significantly. It is interesting to note that the graphs indicate a direct relationship between catalytic activity and the amount of $Al^{+++}$ added, and that the activity of catalyst C is similar to that of the Ir/0.87% $TiO_2$-$Al_2O_3$ catalyst. The activation energy of catalysts A, B, and C increases with a decrease in the amount of added aluminum.

The structure and activity of a metal oxide or composite oxide supported catalyst is altered by the presence of an additional metal ion that is readsorbed and becomes intimately associated with the Group VIII metal catalyst. The incorporation of readsorbed $Al^{+++}$ increases the activity of the supported metal catalyst, and is significant for other catalysts such as Pt, Pd, Os, and Ni.

For a silicon-enhanced catalyst, a high pH reagent can be employed because silicon ions are at least somewhat soluble in alkaline solutions.

While this invention has been described in detail with respect to a preferred embodiment of the invention, it should be understood that many modifications and variations would present themselves to those skilled in the art without departing from the scope and spirit of this invention as defined in the appended claims.

What is claimed is:

1. A process of forming an impregnated supported catalyst in which the structure and activity of a Group VIII metal catalyst, supported on a metal oxide or composite metal oxide support, is altered by the presence of an additional metal ion selected from the group that consists of aluminum, silicon, and zirconium derived from the dissolution of the support or added externally using suitable metal salt precursors during impregnation, wherein the support has a particle size on the order of 40-80 mesh, the process comprising the steps of
co-impregnating the support with a solution consisting essentially of a precursors of said metal catalyst selected from the group consisting of chloroplatinic and chloroiridic acid and mixtures thereof and at the same time with a nitrate precursor of said additional metal, and
calcining at an elevated temperature the support impregnated with the precursors of said metal catalysts and said additional metal to produce said supported catalyst.

2. The process of claim 1 wherein said oxide support is formed of titania, alumina, silica, tungsten oxide, or a combination thereof.

3. The process of claim 1 wherein said impregnating is carried out with an aqueous solution of a soluble salt of said other metal.

4. The process of claim 3 wherein said aqueous solution also includes a reagent containing ions of said Group VIII metal.

5. The process of claim 3 wherein said precursor of said other metal includes aluminum nitrate.

6. The process of claim 1 wherein said calcining is carried out at elevated temperatures on the order of at least 673K.

7. The process of claim 6 wherein said calcining is carried out in air.

8. A process of forming an impregnated supported catalyst in which the structure and activity of a Group VIII metal catalyst, supported on a metal oxide or composite metal oxide support, is altered by the presence of an aluminum metal ion derived from the dissolution of the support or added externally using suitable metal salt precursors during impregnation, wherein the support has a fine-grain particle size on the order of 40-80 mesh, the process comprising the steps of:
co-impregnating the support with a solution consisting essentially of a precursor of said Group VIII metal catalyst and a nitrate precursor of said aluminum metal; and
calcining at an elevated temperature the support impregnated with the precursor of said metal catalyst and said aluminum metal to produce said supported catalyst.

* * * * *

UNITED STATES PATENT AND TRADEMARK OFFICE
CERTIFICATE OF CORRECTION

PATENT NO. : 5,114,902
DATED : May 19, 1992
INVENTOR(S) : James A. Schwarz et al.

It is certified that error appears in the above—identified patent and that said Letters Patent is hereby corrected as shown below:

At column 1, line 5, please insert:

--This invention was made with government support under Grant No. DE-FG0287ER13650 awarded by the United States Department of Energy. The Government has certain rights in the invention.--

Signed and Sealed this

Fifth Day of October, 1993

Attest:

BRUCE LEHMAN

Attesting Officer

Commissioner of Patents and Trademarks